United States Patent [19]

Müller

[11] Patent Number: 4,880,254

[45] Date of Patent: Nov. 14, 1989

[54] ADJUSTABLE GUIDE FOR A VEHICLE SAFETY BELT

[75] Inventor: Olaf Müller, Rüsselsheim, Fed. Rep. of Germany

[73] Assignee: R. Schmidt GmbH, Lennestadt, Fed. Rep. of Germany

[21] Appl. No.: 278,753

[22] Filed: Dec. 1, 1988

[51] Int. Cl.⁴ ............................................... B60R 21/10
[52] U.S. Cl. .................................... 280/808; 297/473; 297/483
[58] Field of Search ................ 280/808, 804; 297/469, 297/483, 473, 486

[56] References Cited

U.S. PATENT DOCUMENTS

| | | | |
|---|---|---|---|
| 4,311,323 | 1/1982 | Provensal | 280/808 |
| 4,322,097 | 3/1982 | Provensal | 280/808 |
| 4,466,666 | 8/1984 | Takada | 280/808 |
| 4,723,793 | 2/1988 | Kato et al. | 280/808 |

Primary Examiner—Kenneth R. Rice
Attorney, Agent, or Firm—Herbert Dubno

[57] ABSTRACT

A rear window frame member of a passenger vehicle has a slit for a slider allowing vertical displacement of the upper guide for a shoulder belt. The slider has rearwardly projecting noses engaging in holes in a rear wall of the rectangular tube and the slider can be tilted in its plane, utilizing an arm projecting through the slit has a handle for indexing the slider at different heights along the tube.

18 Claims, 4 Drawing Sheets

ADJUSTABLE GUIDE FOR A VEHICLE SAFETY BELT

FIELD OF THE INVENTION

My present invention relates to an adjustable guide for a vehicle safety belt and, more particularly, to a shoulder belt of the type adapted to be guided in a frame member of an automotive body, especially a door frame member and particularly a frame member of the window of the door for so-called passive shoulder belts.

BACKGROUND OF THE INVENTION

Safety developments in recent years for automotive vehicles and particularly passenger cars, have led to the development of so-called shoulder belts which can form part of a seat belt arrangement passing over the lap of the driver or passenger, or separate therefrom so that at least one belt or belt pass can extend diagonally across the chest and torso of the driver from one shoulder to the seat.

Such belts are generally referred to as safety belts and specifically as shoulder belts. Shoulder belts generally pass through or are provided with a guide at the side of the vehicle at which the shoulder belt is at its highest point.

In active belt systems, i.e. belt systems in which the shoulder belt automatically engages the torso of the passenger, the upper guide point of the belt is adjustable as to its height by the active belt applying system.

However, in passive shoulder belt systems, this upper guide point has been fixed. This is especially the case where the upper guide point is located on a door of the vehicle. Such systems are in common use in the United States at this time.

The fixed location of the guide point of a passive belt system, however, poses a problem because the comfort of the user frequently requires different guide points for the shoulder belt on the vehicle body and any adjustability cannot be at the expense of safety.

OBJECTS OF THE INVENTION

Accordingly, it is the principal object of the present invention to provide an improved guide assembly for a seat belt which is adjustable as to height, but nevertheless will not detract from the reliability and safety of the safety belt system.

Another object of my invention is to provide an improved guide assembly for a safety belt which will obviate drawbacks of earlier systems.

SUMMARY OF THE INVENTION

These objects and others which will become apparent hereinafter are attained, in accordance with the invention, in a safety-belt guide assembly for an automotive vehicle and particularly a passenger vehicle, which comprises:

a rectangular cross-section tube formed as a rear upright frame member of an automotive vehicle side window and having a first side turned in a direction of travel of the vehicle and a second side opposite the first side, the first side being formed with an upright slit;

a slide received in the tube and provided with and arm projecting outwardly through the slit and formed with a passage externally of the tube through which a safety belt is guided, the slide being movable up and down in the tube; and mating formations on the second side of the tube and on the slide mutually engageable at a plurality of heights of the slide in the tube for securing the slide against movement at a selected one of the heights and by a tilt of the slide corresponding to a downward movement of the arm, the mating formations being mutually disengageable upon an opposite tilting movement of the slide to enable the slide to be shifted to another of the heights.

According to a feature of the invention, the slide comprises a stamped metal plate formed unitarily with the guide arm which projects in one direction from the plate while the mating formations are provided with a row of indexing holes which can be elongated or slit shaped and which are dimensioned to receive a nose projecting from the plate opposite the arm and constituting the mating formation on the slide engageable in the hole.

The plate preferably is provided with a pair of vertically spaced noses engageable in respective pairs of the holes simultaneously.

The plate can be elongated and the nose or noses can be provided at the lower end of the plate while an upper end thereof is formed with a guide body for guiding the plate in the tube and preventing the plate from twisting about its longitudinal axis.

The guide body can be a block injection molded on the upper end of the plate, of rectangular parallelepipedal configuration but with rounded ends to permit tilting of the plate in its plane for engagement of the nose or noses into and withdrawal of the noses from the holes.

A spring means, preferably a leaf spring engaged on a lower end of the plate, can be provided to resiliently urge the nose or noses into the respective holes.

A synthetic resin body can be injection molded around the arm and formed with an elongated opening traversed by the belt.

For greater security in the event of impact, the tube can be provided with a hook member behind which a hook member of the door frame can engage.

In the system of the invention, therefore, a four-sided tube receives the slider, as a slit through which the guide arm of the slider extends in the travel direction and has indexing holes in which the slider can be engaged at different heights and between which the slider can be moved by a tilting action in the plane of the slider.

The slit at the lower end is enlarged to form a window enabling insertion of the slider in the tube.

The slider can be formed in one piece from stamped sheet metal and molded with the guide body which prevents twisting within the tube and the guide body through which the belt passes on the arm.

Because of the curved configuration of the guide body within the tube, the slider can be tilted against the force of the spring to let the noses out of the respective holes and permit the slider to be adjusted upwardly or downwardly to engage in other holes. The synthetic resin body injection molded onto the arm can serve as a handle for this tilting an adjusting movement.

The hook members described provide additional protection against collision and it is possible to cover the slit with a synthetic resin slider and to cover the frame member itself decoratively if desired.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figures 1, 1A:
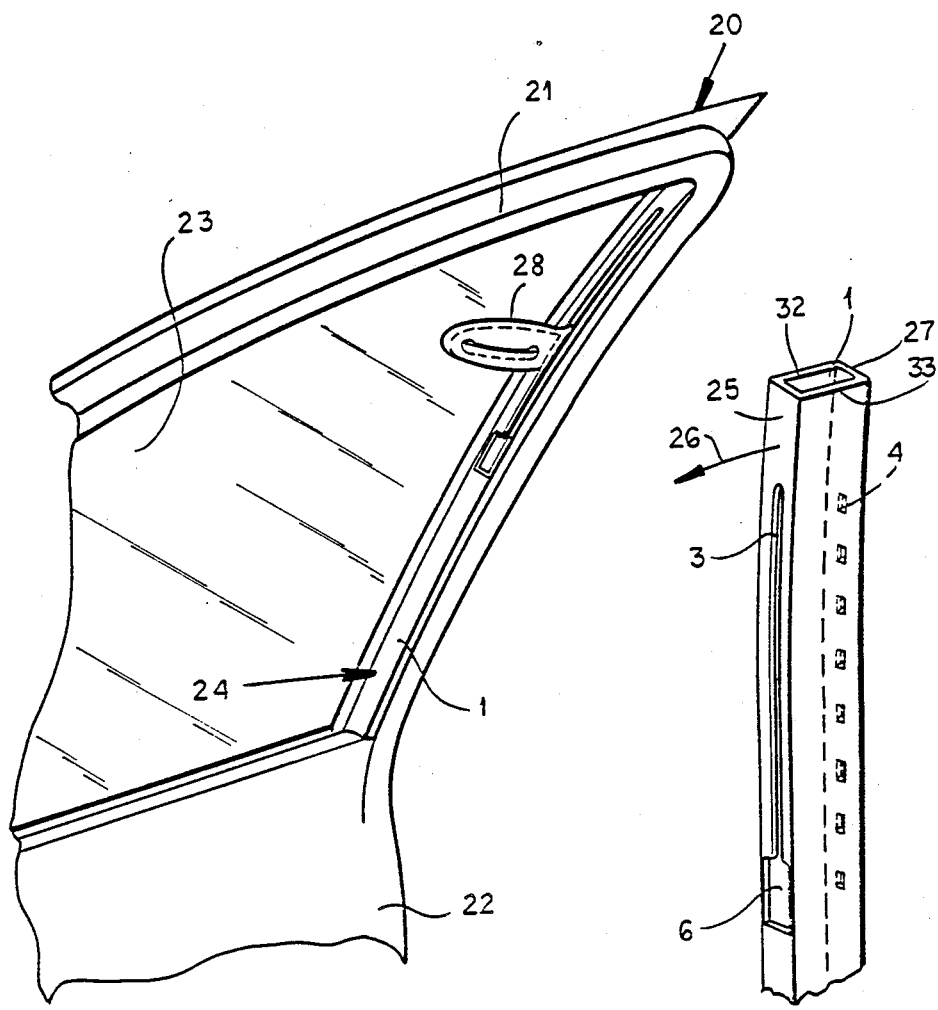
FIG. 1 is a perspective view of a portion of a passenger vehicle door provided with the guide assembly of the invention.
FIG. 1A is a perspective view of a portion of the tube of this assembly.

In FIG. 1, I have shown a door 20 for an automotive passenger vehicle and which comprises the door frame 21, a door panel 22 and a window 23 forming one of the side windows of the vehicle. The window 23 is, in turn, formed by a window frame 24, one of the frame members of which and namely the rear frame member of which is a rectangular section tube one which has been shown in greater detail in the remaining figures.

As is clear from 1A, however, this tube comprises a wall or side 25 facing in the direction of vehicle travel which is represented by arrow 26, and an opposite wall or side 27.

The rectangular section tube is provided in its forwardly facing wall 25 with a slit through which an arm of a slider generally represented at 2 can extend (see FIG. 2) this arm is visible at 28 in FIG. 1.

At its lower end, the slit is provided with an enlargement or window 6 which permits insertion of the slider into the tube. On its wall or side 27 opposite the slit, the tube is provided with spaced apart holes 4, each of which is a rectangular cut out to conform to the shape of projections of the slider 2 which are to engage therein.

The slider 2 (see FIGS. 2, 2A and 2B), comprises an elongated plate 35 and can be stamped from sheet metal. At its upper end, this place is provided with a bend 9 around which a guide body 8 is injection molded. The guide body 8 has a rectangular parallelepipedal configuration with rounded ends 10. The mounted ends 10 lie along the walls 25 and 27, respectively so that the plate can tilt in its plane as represented by the arrow 30 within the tube. However, twisting of the plate in the tube about the axis of the plate, is prevented by the parallel flanks 31 of the guide body 8 which lie substantially against the lateral walls 32 and 33 of the tube 1.

The arm 28 is formed by an injection molded body 12 which completely surrounds the plate portion 36 projecting forwardly from the plate 35 and stamped unitarily therewith.

The plate portion 36 is formed with a slot 37 (see FIG. 2B) around which the material of the body 13 is injection molded to leave an elongated opening 11 as a passage for the shoulder belt The rear of the elongated plate 35 proximal to the lower end thereof is provided with a pair of projecting noses dimensioned to fit into the holes 4 and with a corresponding spacing.

Figure 2A:
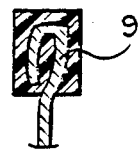
FIG.2A is a section taken along the line IIA—IIA of FIG. 2.
Figure 2:
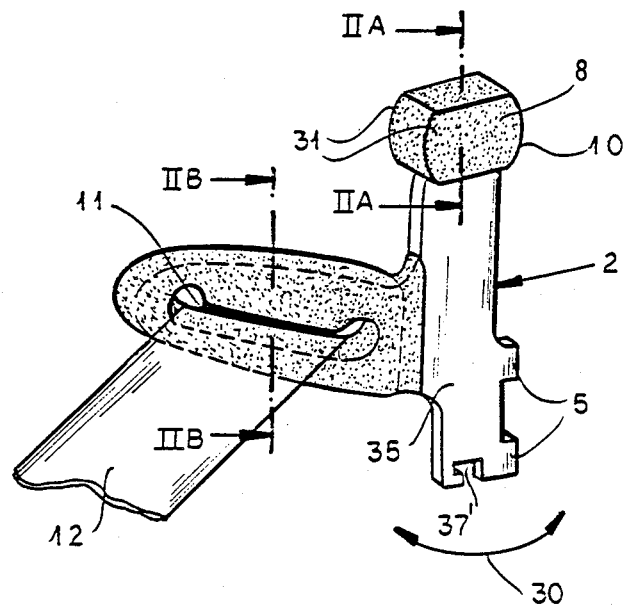
FIG. 2 is a perspective view of the slider, stippling being used to indicate contrasting material.
Figure 2B:
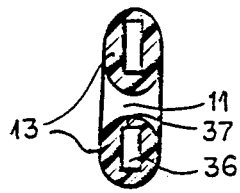
FIG. 2B is a section taken along the line IIB—IIB of FIG. 2.

Finally, with respect to FIGS. 2, 2A and 2B, it can be seen that the bottom of the plate 35 is provided with a notch 37 in which a spring can be anchored.

Figure 3:
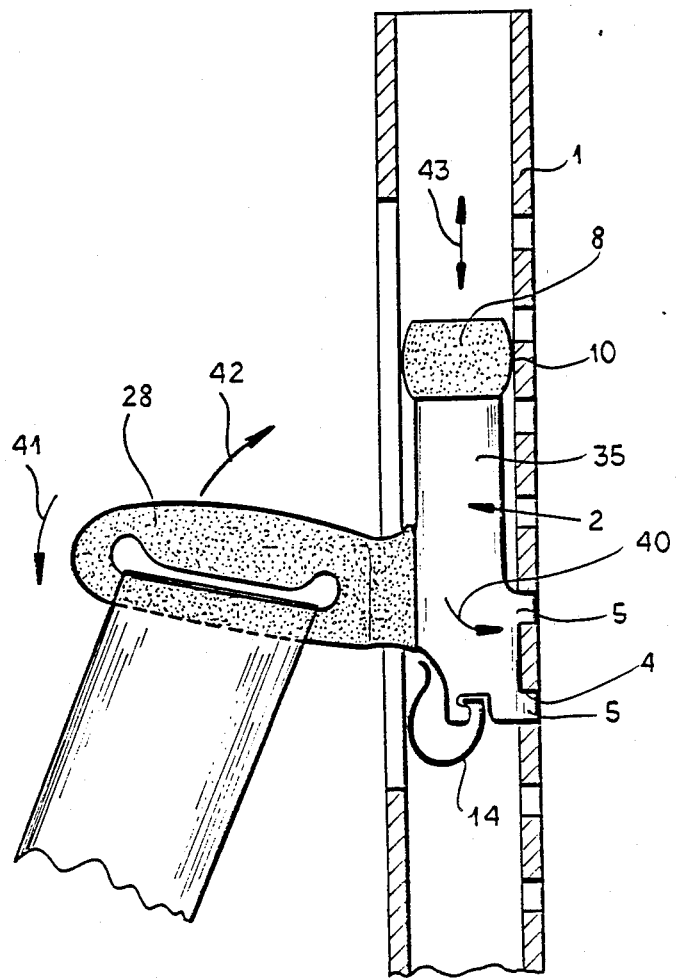
FIG. 3 is a vertical section through a portion of the assembly, showing the slider in elevation.

In FIG. 3 I have shown the parts of the guide system assembled.

The spring 14 here bears on the wall 25 and urges the bottom portion of the plate 2 in the direction of the arrow 40, thereby retaining the noses 5 in a suspending pair of holes 4. The tension on the belt normally applies a force in the direction of the arrow 41 to retain the locked position of the guide.

When, however, it is desired to adjust the guide upwardly or downwardly, the arm 28 is used as a handle by the passenger and is tilted upwardly (arrow 42), to pivot the plate 35 around the ends 10 of the body 8, extracting the noses 5 from the holes 4 and permitting the slider to be moved upwardly or downwardly (arrow 43) to engage the noses 5 in other selected holes.

Figure 4:
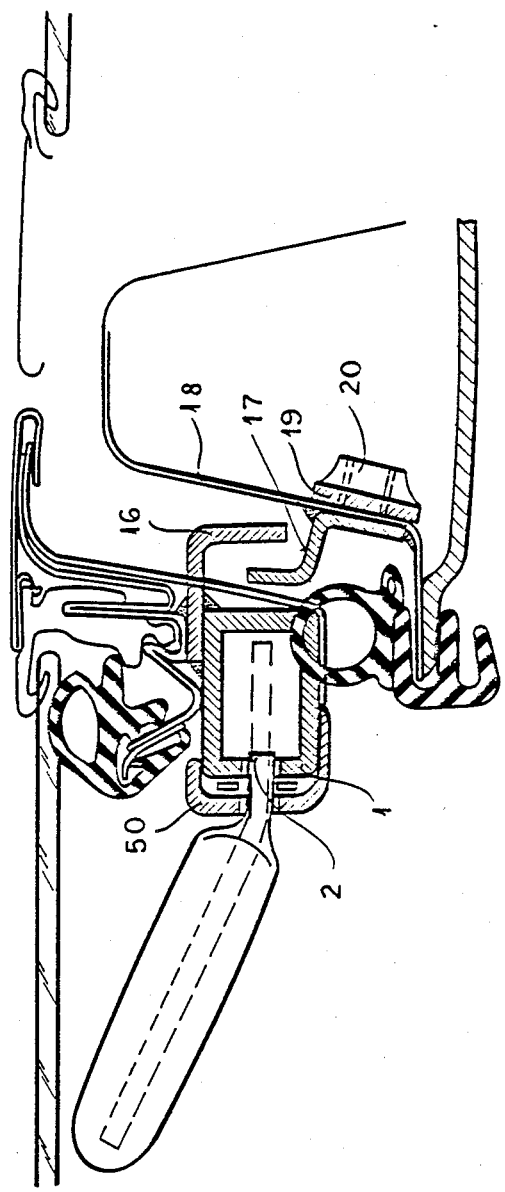
FIG. 4 is a horizontal section through the assembly and associated portions of the door.

In FIG. 4 I have shown the tube 1 and the slider 2. It is also clear that the slider can entrain with it a cover 50 which covers the slit in the tube 1 for esthetic purposes. The tube 1 is shown to be welded to a hook member 16 behind which engages a hook member 17 bolted at 20 to a reinforcement on the B column or post 18 of the vehicle body. The interlocking of the hook members in the event of collision provides greater security for the seat belt arrangement because it allows the tube 1 to brace upon a structure which is fixed to the chassis.

I claim:

1. A safety-belt guide assembly for an automotive vehicle, comprising:

a rectangular cross-section tube formed as a rear upright frame member of an automotive vehicle side window and having a first side turned in a direction of travel of the vehicle and a second side opposite said first side, said first side being formed with an upright slit;

a slide received in said tube and provided with and arm projecting outwardly through said slit and formed with a passage externally of said tube through which a safety belt is guided, said slide being movable up and down in said tube; and mating formations on said second side of said tube and on said slide mutually engageable at a plurality of heights of said slide in said tube for securing said slide against movement at a selected one of said heights and by a tilt of said slide corresponding to a downward movement of said arm, said mating formations being mutually disengageable upon an opposite tilting movement of said slide to enable said slide to be shifted to another of said heights.

2. The safety-belt guide assembly defined in claim 1 wherein said slide comprises a stamped metal plate formed unitarily with said arm projecting in one direction from said plate and at least one nose projecting in an opposite direction on said plate and forming one of said mating formations, said second side of said tube being formed with a row of indexing holes dimensioned to selectively receive said nose.

3. The safety-belt guide assembly defined in claim 2 wherein said plate is provided with a pair of vertically spaced noses engageable in respective spaced apart ones of said holes simultaneously.

4. The safety-belt guide assembly defined in claim 2 wherein said plate is elongated and said nose is provided at a lower end of said plate.

5. The safety-belt guide assembly defined in claim 4 wherein an upper end of said plate is formed with a guide body guiding said plate in said tube and shaped to permit said tilting of said plate.

6. The safety-belt guide assembly defined in claim 5 wherein said body is an injection-molded block formed on said upper end of said plate, said block being generally rectangularly parallelepipedal but having opposite rounded ends.

7. The safety-belt guide assembly defined in claim 2, further comprising spring means on said slide bearing against said tube for urging said nose into a respective one of said holes.

8. The safety-belt guide assembly defined in claim 2, further comprising a synthetic resin body injection molded around said arm and formed with an elongated opening traversed by said belt.

9. The safety-belt guide assembly defined in claim 1 wherein said tube is provided with a hook member projecting forwardly in a direction of forward travel of the vehicle, the vehicle having a body provided with a hook member engaging behind the hook member of said tube.

10. The safety-belt guide assembly defined in claim 9 wherein said tube is on a door of the vehicle and said hook member provided on said body is on a door frame of the body surrounding the door.

11. The safety-belt guide assembly defined in claim 10 wherein said slide comprises a stamped metal plate formed unitarily with said arm projecting in one direction from said plate and at least one nose projecting in an opposite direction on said plate and forming one of said mating formations, said second side of said tube being formed with a row of indexing holes dimensioned to selectively receive said nose.

12. The safety-belt guide assembly defined in claim 11 wherein said plate is provided with a pair of vertically spaced noses engageable in respective spaced apart ones of said holes simultaneously.

13. The safety-belt guide assembly defined in claim 12 wherein said plate is elongated and said noses are provided at a lower end of said plate.

14. The safety-belt guide assembly defined in claim 13 wherein an upper end of said plate is formed with a guide body guiding said plate in said tube and shaped to permit said tilting of said plate.

15. The safety-belt guide assembly defined in claim 14 wherein said body is an injection-molded block formed on said upper end of said plate, said block being generally rectangularly parallelepipedal but having opposite rounded ends.

16. The safety-belt guide assembly defined in claim 15, further comprising spring means on said slide bearing against said tube for urging said noses into respective ones of said holes.

17. The safety-belt guide assembly defined in claim 16, further comprising a synthetic resin body injection molded around said arm and formed with an elongated opening traversed by said belt.

18. The safety-belt guide assembly defined in claim 1 wherein said slit is terminated at its lower end in an enlarged window through which said slide is insertable in said tube.

* * * * *